(12) United States Patent
Willins et al.

(10) Patent No.: US 7,130,759 B2
(45) Date of Patent: Oct. 31, 2006

(54) TELEMETRIC CONTEXTUALLY BASED SPATIAL AUDIO SYSTEM INTEGRATED INTO A MOBILE TERMINAL WIRELESS SYSTEM

(75) Inventors: Bruce A. Willins, East Northport, NY (US); Richard M. Vollkommer, Smithtown, NY (US); Joseph Katz, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/019,313

(22) Filed: Dec. 23, 2004

(65) Prior Publication Data

US 2005/0108646 A1    May 19, 2005

Related U.S. Application Data

(63) Continuation of application No. 10/372,159, filed on Feb. 25, 2003, now Pat. No. 6,845,338.

(51) Int. Cl.
G01C 17/00 (2006.01)
G06F 15/00 (2006.01)

(52) U.S. Cl. .............. 702/150; 702/152; 702/153; 340/988; 340/990

(58) Field of Classification Search .............. 702/151, 702/152, 153, 117, 122, 182, 150; 340/988, 340/989, 990; 709/227, 228; 713/165, 185
See application file for complete search history.

(56) References Cited

U.S. PATENT DOCUMENTS 3,934,202 A    1/1976    Missale ............... 325/54
5,717,392 A    2/1998    Eldridge ............. 340/996
6,181,371 B1    1/2001    Maguire, Jr. ......... 348/121
6,199,045 B1    3/2001    Giniger et al. ....... 705/1
6,459,388 B1    10/2002    Baron ................ 340/996
6,684,176 B1 *    1/2004    Willins et al. ....... 702/150
6,845,338 B1 *    1/2005    Willins et al. ....... 702/150
2004/0117623 A1 *    6/2004    Kalogridis et al. ... 713/165

OTHER PUBLICATIONS

"Introductory Digital Signal Processing with Computer Applications", by Paul A. Lynn et al., published by John Wiley & Sons, NY, NY, 1989, pp. 32-50.

* cited by examiner

Primary Examiner—Bryan Bui
(74) Attorney, Agent, or Firm—Morgan & Finnegan, LLP

(57) ABSTRACT

A telemetric contextually based spatial audio system is integrated into a mobile terminal including a headset and antenna. The headset includes an electronic compass which determines head orientation data for the user. The terminal's geographical position can either be determined locally (e.g. onboard GPS) or by network triangulation. The orientation and position data are sent to a server which overlays the position and head orientation data onto a locally stored "floor plan", describing an object(s) of interest. The floor plan relates the user's viewpoint to a database of contextual audio clips. A regionally significant portion of the database and respective triggers are sent to the terminal. The terminal using the database information recalculates which audio clip(s) to play. The terminal then convolves the respective audio clip(s) via an impulse response function so as to be perceived by the user as emanating from the exact spatial position of the object specified by the system.

25 Claims, 4 Drawing Sheets

FIGURE 3

| RELATIVE ANGLE (DEGREES) | I. RELATIVE DISTANCE | II. IMPULSE RESPONSE FILTER |
|---|---|---|
| 0° | Close | $IRF_{0-Close}$ |
|  | Mid-range | $IRF_{0-Mid-range}$ |
|  | Distant | $IRF_{0-Distant}$ |
| 5° | Close | $IRF_{5-Close}$ |
|  | Mid-range | $IRF_{5-Mid-range}$ |
|  | Distant | $IRF_{5-Distant}$ |
| 10° |  |  |
| 15° |  |  |
| 20° |  |  |
| ... | ... | ... |
| 355° | Close | Close |
|  | Mid-range | Mid-range |
|  | Distant | Distant |

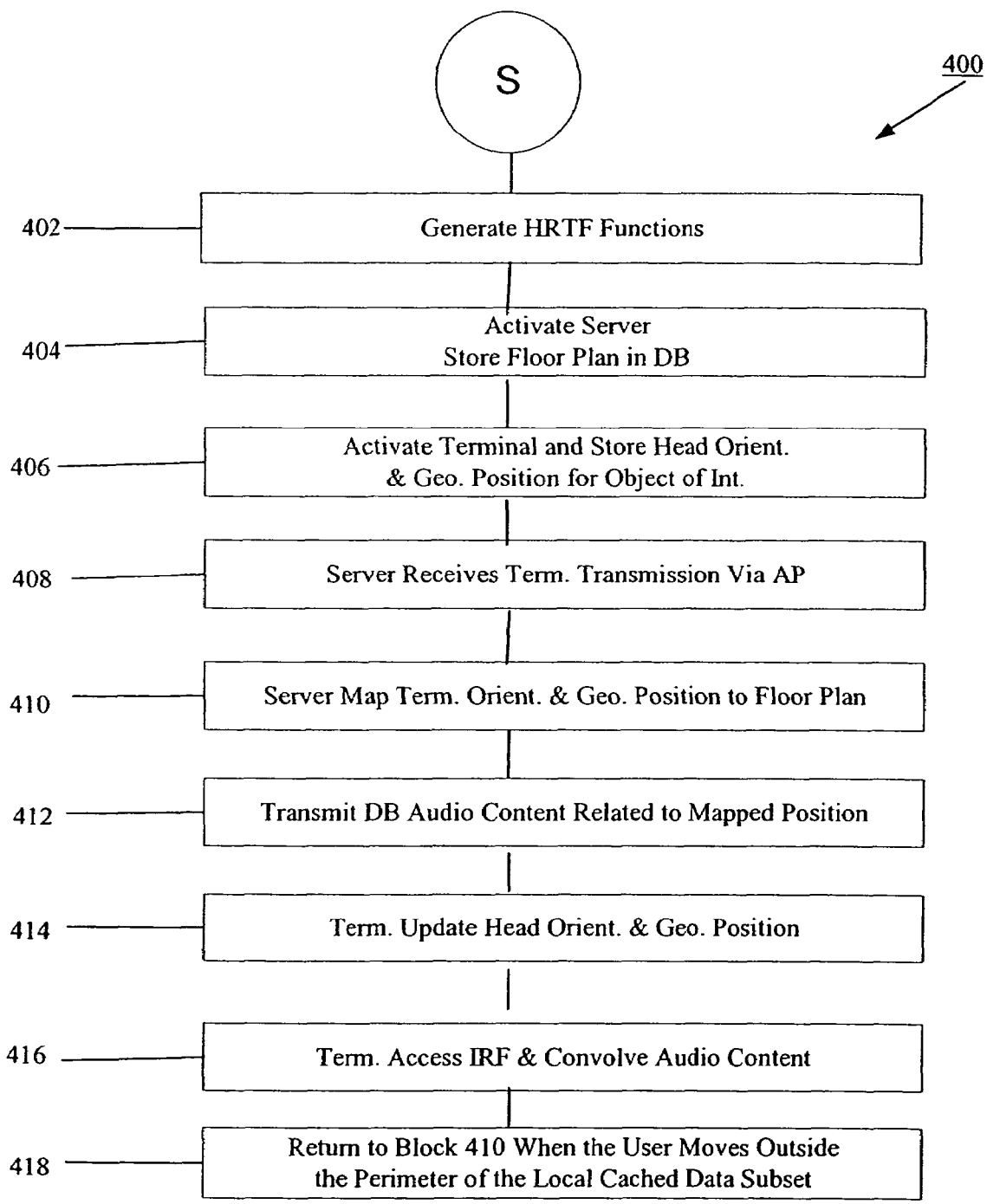

TELEMETRIC CONTEXTUALLY BASED SPATIAL AUDIO SYSTEM INTEGRATED INTO A MOBILE TERMINAL WIRELESS SYSTEM

This is a Continuation Application of prior application Ser. No. 10/372,159 filed Feb. 25, 2003, now U.S. Pat. No. 6,845,338 assigned to the same assignee as that of the present invention, and to which priority is claimed.

RELATED APPLICATION

U.S. application Ser. No. 09/961,373 entitled "Three Dimensional (3D) Object Locator For Items or Sites Using An Intuitive Sound Beacon: System and Method of Operation", filed Sep. 25, 2001, assigned to the same assignee as that of the present invention, and fully incorporated herein by reference.

BACKGROUND OF THE INVENTION

1. Field of the Invention

This invention relates to mobile information systems and methods of operation. More particularly, the invention relates to a telemetric contextually based spatial audio system integrated into a mobile terminal wireless system.

2. Description of Prior Art

Self-guided tours have long been used to enhance an individual's experience at art exhibits, industry trade shows, museums, cruise lines, historic sites and the like. In the past, self guided tours required the user to go from location to location and typically read written tags on each item or from a brochure. In many instances, this activity places too much of an imposition on the user and is slowly being replaced by localized audio broadcasts. Under this model, audio clips are played based on the proximity of the user to the specific item. Though easier for the individual, this model still lacks the animated and interactive experience desired in viewing items, exhibits and the like. Further, self-guided tours require the user to get within the proximity of the exhibit in order to find out what the exhibit is about, once again an imposition on the individual. In addition, once the user is at the location, the user must listen to the generalized audio even though they may only be interested, or may be particularly interested, in specific aspects of the location. Furthermore, the audio play-out has no method of directing the user's attention to particular features at the location other than to obtrusively give the user directions on where to look, which is particularly difficult since the system does not know the exact location, or the direction in which the user is facing. Finally, there is no way to personalize the audio of a particular exhibit to the individual user since the system has no ephemeral data on the user (e.g. knowing that a user has been present at a specified location, looking in a particular direction for a prolonged period of time can be construed as an area of interest) or a priori knowledge of the individual.

What is needed in the art is a system and method to animate the experience of a user relative to an item, exhibit; enable the user to hear about an item or exhibit based on their location and field of view; personalize the audio presentation based on specific interests of the individual; provide intuitive directional cues to bring attention to items of interest, and to guide the user to a desired location.

Prior art related to mobile communication systems, includes:

U.S. Pat. No. 3,934,202 issued Jan. 20, 1976 discloses an electronic tour guide system including means for suppressing objectionable crosstalk and noise. Crosstalk suppression is achieved by means of a compressor in the transmitter and an expander in the receiver. Objectionable noise between loops is eliminated by means of a squelch circuit, which reduces power drain whenever the received signal is below a certain threshold. The transmitter and receiver are designed to handle a plurality of information signals simultaneously. For example, a listener can select one of several different languages broadcast within an antenna loop. The transmitting loop antenna is matched in impedance to the output of the channel means in the transmitter so that maximum power transfer is obtained. Each receiver is further equipped with a gravity operated mercury switch which turns off power to the receiver when the receiver chassis is inverted. It is anticipated that this system will find application in museums, art galleries, archeological sites and the like where it is desirable to guide people from location to location and to address them in their respective languages.

U.S. Pat. No. 5,717,392 issued Feb. 10, 1998 discloses a position-responsive information presentation system and control. The system and control program automatically provides multimedia output that is responsive to a user's location, speed, acceleration, and directional orientation. Also disclosed is a system that receives position information from various systems, including satellite global position systems. As disclosed, the system and control program may provide video, audio and tactile outputs to users.

U.S. Pat. No. 6,459,388 issued Oct. 1, 2002 discloses a location database system provides information about nearby sites to a user. The system includes a processor configured to identify the present location of the system using the Global Positioning System. The processor is also associated with a clock providing real-time information. The clock may be the internal clock of a microprocessor serving as the processor of the system. The processor may also communicate with a remote database of sites using a wireless connection. The database includes relevant information about the sites, which may be of interest to a user of the system, such as locational information, imaging information and images, and/or tour-guide type information. A display provides a visual display of the relevant information to the user, and the system may provide setting information for the camera and also may provide travel directions to a particular site, based on a selected view as seen on a display.

U.S. Pat. No. 6,181,371 issued Jan. 30, 2001 discloses a head guide with a display is attitudinally controlled for guiding the head of a passive viewer wherein the display is for viewing images that are emulative of images viewed by a cameraman with head mounted cameras whose head attitude is monitored for controlling the head guide in synchronism with the images gathered by the cameras. Additionally, the viewer's eyes may be induced to follow a sequence of visual fixations at the same time as the passive viewer's head is induced to execute attitudinal movements consistent therewith.

U.S. Pat. No. 6,199,045 issued Mar. 6, 2001 discloses a system for providing position-related information to a mobile user includes a mobile unit and a central site server. The mobile unit includes circuitry for determining present position information from position signals, which may emanate from, for example, GPS satellites. The mobile unit further includes circuitry for establishing a wireless bi-directional communications link with the central site server via a terrestrial network, which may be accessed via a cellular telephone network. The central site server includes circuitry for receiving the present position information from the mobile unit. A table stored at the central site server includes different response information in correspondence with possible positions of the mobile unit. The response information may further be in correspondence with user preferences. The central site server uses the received present position information to retrieve corresponding response information from the table, and sends the retrieved response information to the mobile unit via the bi-directional communications link. The mobile unit further includes circuitry, such as a loudspeaker, for supplying the response information to the mobile user. In another aspect of the invention, communications between the mobile unit and the central site server are encrypted. Furthermore, the mobile unit may include components for preventing position information from being supplied to the loudspeaker, thereby eliminating distracting noise from being presented to the user.

USP Application 0020091793 published Jul. 11, 2002 discloses a method and system for tourist guiding, including both navigation and narration, utilizing mobile computing devices such as electronic books, palm computers, smart cellular phones, and future wearable computers. Loaded with, or Internet-connected to a Digital Guidebook, the system navigates the tourist to and within tour sites using an invented Visual Navigation method, and provides detailed multimedia narrations on objects along the tour. The system also navigates the tourist to other tourist destinations such as hotels and restaurants. An additional preferred embodiment combines GPS and CPS navigation with Visual Navigation The system also creates a Digital Tour Album that captures the time and the places where the tourist has visited. The system also allows Armchair Touring and provides Tour Reviews on DVD. The Electronic Tourist Guide is based on latest mobile and wireless communication technologies and allows Internet channeling of live, timely information such as special events, latest prices and schedules. Digital Guidebooks can be downloaded to the tourist's device memory, or streamed to the tourist's device in real-time during the tour. The present invention entails two technologies: studio production and distribution of multimedia Digital Guidebooks, and use of mobile digital tourist guidebooks. The latter field entails mobile computing devices, wireless broadband Internet, and Geographic Information Systems.

None of the prior art discloses a system and method to animate the experience of a user S relative to an item, exhibit; thereby enabling the user to hear about an item or exhibit based on their field of view, and personalizing the audio presentation based on specific interests. None of the prior art discloses intuitive methods of using spatial directional audio to bring the user's attention to a specific aspect of the location.

Moreover, none of the prior art discloses a mobile terminal capable of dynamically creating spatial audio sounds by using a set of locally stored impulse-response functions emulating angular positions of a sound relative to the user's head. And to this end, convolving such sounds in real-time according to the individual's head position relative to the item (e.g. to give the user a perception that the audio sound is actually emanating from a point in the object viewed by the individual).

For clarity, we refer to the spatial location at which the audio appears to be emanating from, as the "audio emanation point" (AEP). The AEP may map to a physical object, can be used as a stimuli to draw or direct the user's attention to a specified direction, or to animate the users experience using other spatial audio effects.

SUMMARY OF THE INVENTION

This system enables a user: (a) to obtain individualized audio information based on his/her position and head orientation (e.g. descriptions of merchandize items for sale, trade show displays, etc.), b) to have an enhanced audio-visual experience by having sounds perceived as being emitted from stationery objects, moving objects, or any point in 3D space (e.g. in a museum exhibit, a squawking sound appears to be emanating from a bird on the user's left side while a growl emanates from a bear as perceived on the users s right), c) to have the user's attention drawn to other items using spatially directed audio and based on their current and past actions (e.g. a user looking at a set of dishes is drawn to another location using spatially directed sound to describe a matching set of cups), and d) to provide a virtual tour-guide through spatial audio (e.g. a user is directed to a conference room by following the direction of a synthesized voice which is spatially located and continually updated so as to guide the user in the proper direction).

The user is equipped with a mobile terminal including a binaural stereo audio headset and an antenna for wireless communication with a server via an access point. The headset includes an electronic compass or device providing equivalent angular positioning, which determines the user's head orientation (e.g. azimuthal direction the user is looking). Head orientation data is sent to a server via a wireless access point. The terminal's position can either be determined locally (e.g. onboard GPS) or by using the network infrastructure to triangulate the terminal's transmission. In either scenario, all terminal position information is conveyed to the server.

The server overlays the user's geographical position and head orientation information onto a locally stored "floor plan." The floor plan relates the user's viewpoint to a database of contextual audio clips based on position, orientation, and other event triggers (e.g. time duration at one position). The database also includes, or the server determines dynamically, the relative angular position and distance that the spatially directed audio should emanate from (AEP) based on the given user's position. A regionally significant portion of the database and respective triggers are sent to the terminal- The terminal updates its ephemeral data (current location and head orientation), and using the database information recalculates which audio clip(s) to play. Before playing the clip(s), the terminal updates its relative distance and angular positioning relative to the object from which the sound is to emanate. The terminal then convolves (see below) the respective audio clip(s) so as to be perceived by the user as emanating from the exact spatial position of the object specified by the system (AEP).

Based on the geographical position of the user and users head orientation, the terminal either plays an audio clip describing what the user is directly viewing (broadside) and/or plays a spatial audio redirecting the user's attention to an item at a known off-center location from the user's view. The audio is perceived by the user as emanating from the item or direction of interest. To create this sound perception, the terminal accesses a table of impulse response functions. Each impulse response function is a generalized transfer function representing filter characteristics sufficient to transform a sound so as to be perceived by the user as arriving at their head from a specific angle (generally measured as 0 degrees directly in front of the person) and distance. Given an audio clip to play and knowing the relative angle and distance between the user and the object (AEP), the terminal convolves the audio clip with the respective (angle and distance) impulse response function and plays the resultant audio to the user. This gives the user the perception that the sound is actually emanating from that point in space (AEP). As the user changes his/her head orientation and/or geographical position, the audio is continuously re-convolved with the respective impulse response function, making the sound perceived by the user as continuously being emitted from the AEP. Constant monitoring of the telemetry data enables the spatially mapped sounds to maintain a constant relative position to the user. Note that the system can also create moving sounds relative to the user. In addition, by controlling volume levels and reverberation, the perceived relative distance between the object and the user can be altered.

An aspect of the invention is a mobile terminal storing a series of impulse response functions used to create 3 dimensional (3D) sounds that are perceived by the user as being spatially located at a defined relative angular and distance position (as if emanating from the AEP).

Another aspect is a terminal capable of convolving an audio stream(s) to support a dynamic positional relationship between the user and the AEP (i.e. a user's head is turning relative to a fixed AEP or the AEP is moving with respect to a static head orientation).

Another aspect is the ability to locate a mobile device using either a wireless network infrastructure (through triangulation) or incorporating locating capabilities within the mobile device (e.g. GPS). Location information is sent to a server, which determines the angle and distance relationship relative to objects of interest.

Another aspect is a real-time, headset based, tracking mechanism to measure angular orientation of the user's head. This information is then used to determine the angular orientation of the user's head relative to the object(s).

DESCRIPTION OF THE DRAWINGS

These and other aspects, features and advantages will be more fully understood from the following description of a preferred embodiment taken in conjunction with an appended drawing, in which:

FIG. 3 is a table of Impulse Response Functions for an object of interest viewed by a user in the system of FIG. 1.

FIG. 4 is a flow diagram implementing the system of FIGS. 1, 2 and 3.

DESCRIPTION OF PREFERRED EMBODIMENT

Figure 1:
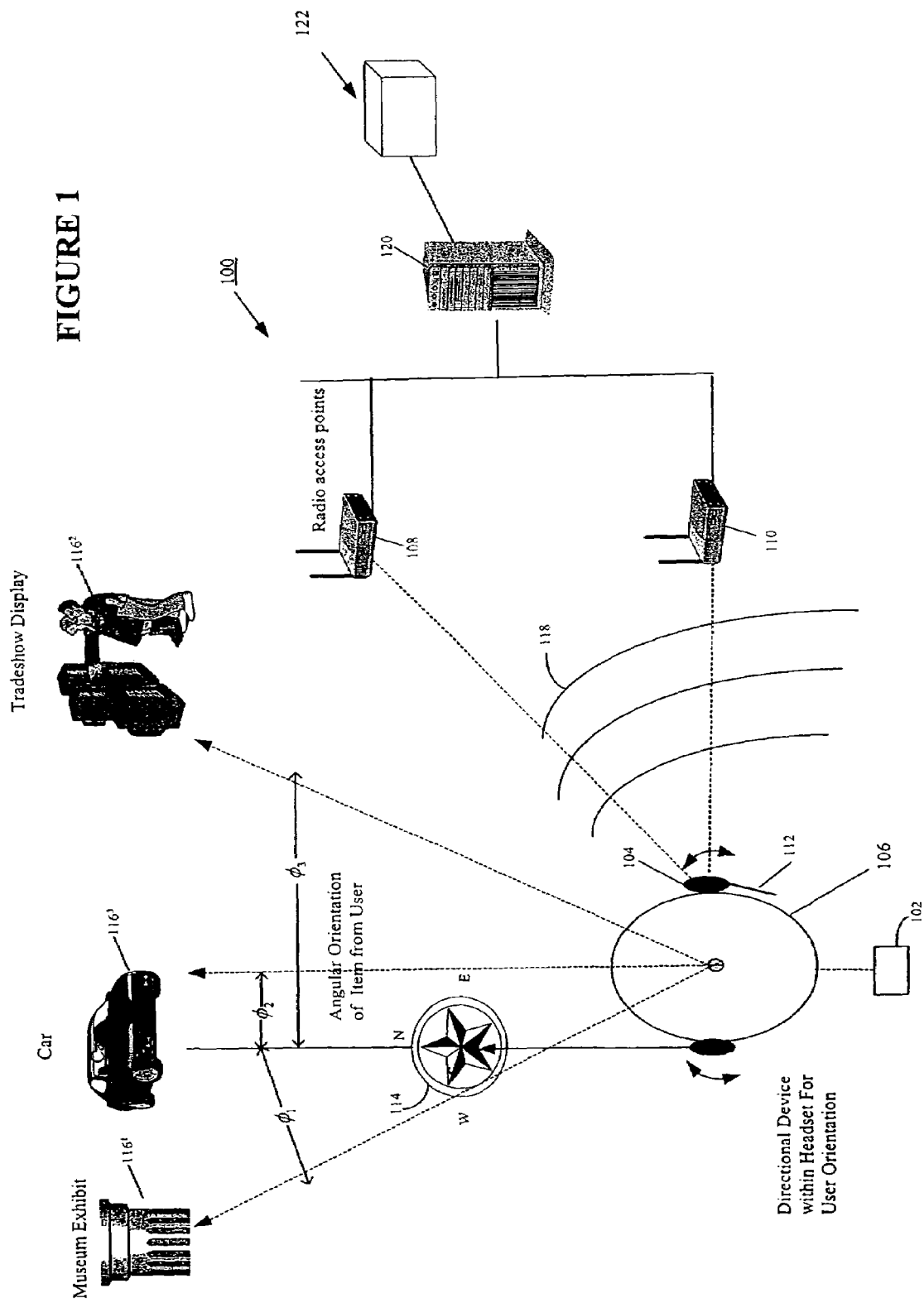
FIG. 1 is a representation of one embodiment of a telemetric contextually based spatial audio system integrated into a mobile terminal wireless system incorporating the principles of the present invention.

FIG. 1 discloses a telemetric contextually based spatial audio system 100 integrated into a mobile terminal 102 including a headset 104 attached to a user 106 and linked to radio access points 108 and 110, via antenna 112. The headset includes (see FIG. 2) speakers 228 and 230; a transceiver 222 used to transfer data and audio signals between the headset and terminal; a directional device 114, e.g. electronic compass, GPS, accelerometers, indicating the position and/or heading or angular direction of the user when viewing objects of interest, e.g. a museum exhibit $116^1$; a tradeshow display $116^2$ and a car $116^3$. The system tracks the relative angle and distance from the user to each object. The angular orientation for object $116^1$ is $\phi_1$. The angular orientation for object $116^2$ is $\phi_2$. The angular orientation for object $116^3$ is $\phi_3$. As the user travels towards an object of interest, the distance and angular orientation of the object changes relative to the user. The terminal 102 (See FIG. 2), periodically transmits a RF signal 118, containing information about the user's head orientation and position. Alternatively, the terminal position can be determined using the RF signals received by access points 108 and 110.

Figure 2:
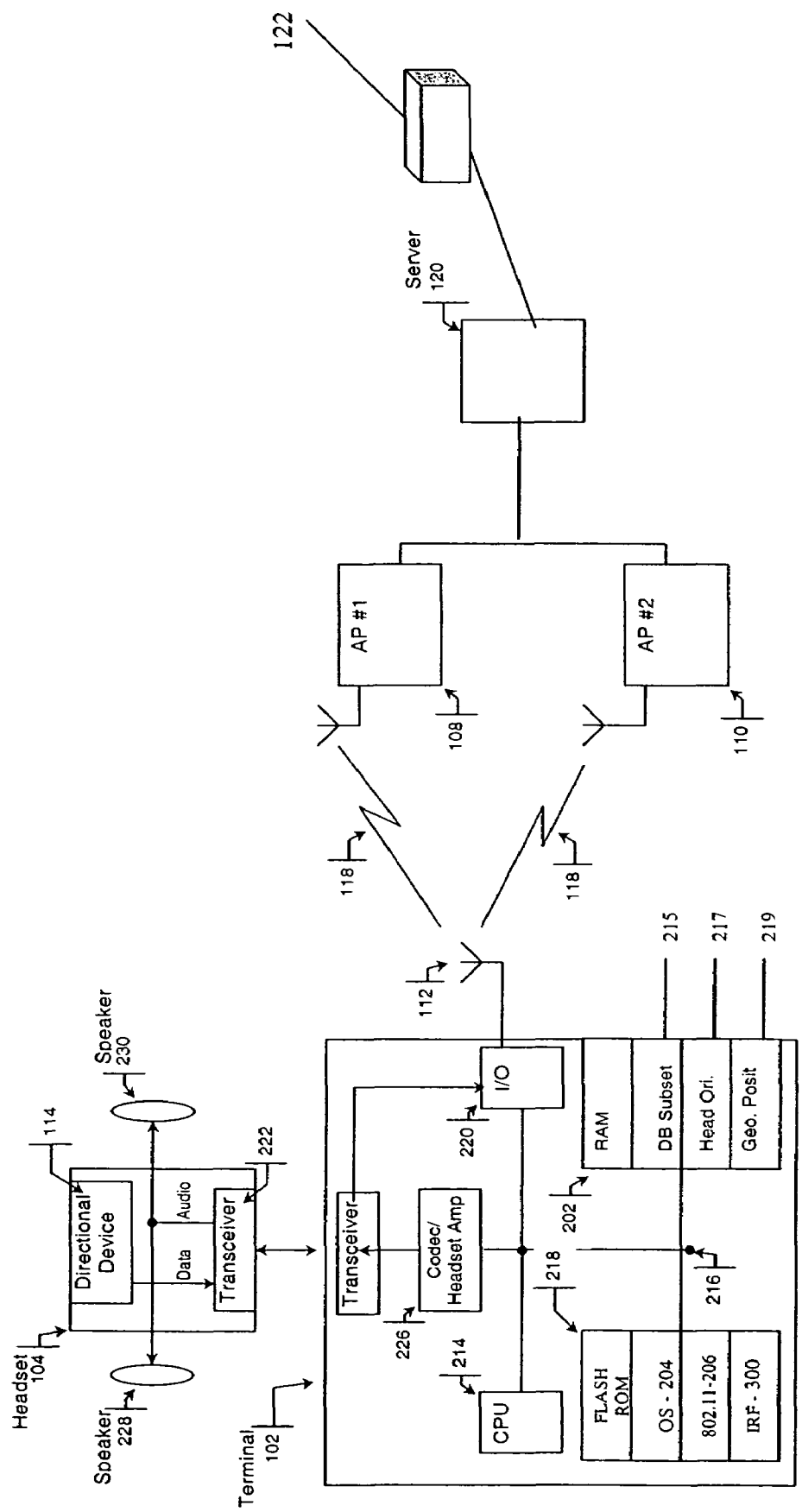
FIG. 2 is a representation of a user equipped with a headset and terminal linked to a server via an access point for implementing the audio system of FIG. 1.

FIG. 2 shows further details of the information system 100 of FIG. 1, including the terminal 102, headset 104 and the server 120. The terminal 102 is a mobile terminal including a FLASH 218 and RAM 202 memory. The FLASH stores program instructions for operating the terminal and processing the generic audio clips into spatial representations. The program instructions include an operating system 204, typically Microsoft Pocket PC or the like, and IEEE Protocols, 802.11(bag)/(x) 206 for establishing and conducting low-powered communications with the access points 108 and 110, via antenna 112. A table of inpulse response functions 300 (see FIG. 3) is also stored in the ROM 218. The RAM stores data subsets 215 related to objects of interest, as will be described hereinafter along with, head orientation data 217 obtained from the directional device 114 and geographical positional information 219 obtained from GPS or like transmitters (not shown).

The terminal further includes a CPU or microprocessor 214 linked to the memory via a bus 216, an I/O subsystem 220 and Audio Subsystem 226 for receiving and transmitting signals to the headset 104 and antenna 12. A power supply (not shown) provides the power for the operation of the terminal and the headset.

Returning to FIG. 1, all terminal data received at the access point(s) is passed to the server 120, including positioning data. The server 120 either has a priori knowledge of the objects' locations or can derive their positions dynamically using other techniques (e.g. triangulating off radio transmitters or RF tags attached to the objects). With this information the server can determine the relative angle and distance of the user with respect to the objects of interest. The server 120, knowing the identity and location of the objects, the user's geographical position and head orientation, selects and transmits a context specific portion of a local database 122 to the terminal as a database subset 215 which is stored in the RAM 202 (See FIG. 2). This subset of the database contains audio clips, angular and distance cues for each clip, and the circumstantial events that cause each clip to be played to the user relative to an object of interest. This data subset essentially caches likely near-term events at the terminal, allowing the terminal to be more responsive to changes (e.g. user position or head turns).

The terminal detects when the user is moving outside the perimeter defined by the locally cached database and requests a cache update from the server 120. Alternatively, the server can initiate a cache update as required.

FIG. 3 describes a table of impulse response functions 300 (also known as, Head Relative Transfer Functions—HRTF) stored in the terminal's RAM 202 or FLASH 218. Each impulse function models an AEP located at a specific geometric location relative to a fixed user coordinate system (generally measured as 0 degrees directly in front of the person). A directional sound is created by the terminal CPU 214 by first determining the relative angle 302 and distance 304 between the user and the object of interest, and then convolving the desired audio clip with the appropriate function listed in the HRTF field 306 for the respective angle and distance. A description of impulse response function and convolution are described in the text, "*Introductory Digital Signal Processing with Computer Applications*", by Paul A. Lynn et al., published by John Wiley & Sons, N.Y., N.Y., 1989 at pages 32–50.

Using the locally cached database 215 and current user geometry, the terminal looks up the relevant audio clip, convolves the audio with the impulse response function stored in the terminal and plays the result to the user via the headset, creating a sound perceived as being located at the AEP. As the user's relative positioning changes with respect to the object, either a new audio clip is played or the remainder of the existing audio clip must be re-convolved and then seamlessly spliced into the audio output. The terminal continuously repeats this process in order to maintain a robust user experience.

Constantly monitoring the telemetry of the user enables 3-D sounds to maintain a constant relative position to the user. As a result, the user's experience with the object is animated. By way of example, and returning to FIG. 1, a user at a museum exhibit 116[1] stands in front of a panoramic presentation depicting a polar landscape containing lifelike models of Eskimos, seals, polar bears, and birds. The audio presentation is initiated based on the user's proximity to the exhibit. The headset tracks the relative position of the user's head, irrespective of where the user is standing, 3-D sounds begin to emanate from the exhibit. The system using the impulse response functions 300, synthesizes the chirping of the birds so as to make the user believe that the sound is actually coming from the birds themselves The system can be designed to make it sound as though the polar bear was charging the user by modifying the intensity and the reverberation of the sounds.

Using the telemetry data to customize the audio presentation material further augments the user's experience. For example, the user is walking through a trade show exhibit hall 116[2] nd looks at a new car 116[3]. Based on the geographical coordinates and head orientation, an audio clip is presented, which provides an overview of the car. As the user walks closer to the car, the audio clip is changed and begins to describe the car in detail. Finally, it is possible that when the user walks to the rear left window where the sticker price of the car is located, the user may be presented with financing information for the car in another audio clip.

Multiple HRTF tables 300 can be stored which can improve operation and perceived correctness. For example, unique HRTF tables can be built to mimic the sound characteristics of the environment in which the user is located (e.g. the sound in an auditorium is different from the sound outdoors). Also, since HRTF impulse functions vary slightly based on a person's head shape and auditory pathways, it is possible to store HRTF tables optimized for an individual user's localization. A training sequence in which the user is subject to a set of sounds in specific directions and selects the sound that most accurately matches the direction, would enable the system to use the optimal HRTF tables for the individual.

Turning to FIG. 4, a process 400 will be described in conjunction with FIGS. 1, 2 and 3 for activating and operating the system 100 of FIG. 1. In block 402, a set of HRTF functions 300 are generated for a user after completion of a training sequence, and stored in the terminal FLASH ROM 218 or RAM 202. In block 404, the server 120 is activated and stores in the database 122, a floor plan related to object of interests, the floor plan containing contextual audio clips for the objects of interest based on a user's position, orientation and event triggers. In block 406, the terminal directional device and transceiver are activated and the head orientation and geographical position obtained from GPS are stored in the RAM 202. The terminal is linked to the access points 108, 110 using the IEEE 802.11 (b) protocols stored in the FLASH ROM. In block 408, the server 120 receives the terminal transmission via the access point providing the user's head orientation and geographical position or calculates the user's geographical position by radio triangulation. In block 410, the user's head orientation and geographical position are mapped to the floor plan and the server selects a regionally significant part of the database content related to audio clips and triggers for the mapped geographical position and head orientation. In block 412, the database content is transmitted to the terminal and stored in the RAM 202. In block 414, the terminal updates its current location and head orientation, and re-calculates which audio clips in the database subsets 215 to play. In block 416, based on the user's relative head orientation and relative distance to the object of interest, the table 300 is accessed to select the impulse response function which is convolved with the re-calculated audio clip and the terminal plays the audio clip to the user via the speakers whereby the user perceives sound as emanating from the exact spatial position of the object of interest. As the user changes head position and/or geographical position the audio is continuously convolved with respective Impulse Response Function making the sound perceived as continuously emanating from the AEP. In block 418, the process beginning at block 410 is repeated when the user moves beyond the perimeter of the locally cached database subset.

While the invention has been described with reference to a preferred embodiment, various changes can be made without departing from the spirit and scope of the invention, as defined in the appended claims, in which:

We claim:

1. A telemetric contextually based audio system integrated into a mobile terminal in a wireless system, comprising:
   a) A user transported mobile terminal coupled to a server via an air link;
   b) a headset coupled to the terminal and including a directional indicator indicating the user's head orientation relative to an object viewed by the user;
   c) the mobile terminal including a transmitter transmitting signals to the server indicative of the user's geographical position and head orientation;
   d) the server configured to:
      (i) map the user's head orientation and geographical position to a physical layout of the object viewed;
      (ii) select and transmit to the terminal clips of audio sound descriptive of the object viewed based upon the user's mapped position and head orientation; and
   e) the mobile terminal further including a processor convolving the audio sound to give the user a perception that the audio sound is actually emanating from a point in the object viewed by the user.

2. A telemetric contextually based audio system integrated into a mobile terminal in a wireless system for instructing a user in the performance of a task, comprising:
   a) A user transported mobile terminal coupled to a server via an air link;
   b) a headset coupled to the terminal and including directional means indicating the user's head orientation relative to a task to be performed by the user;
   c) transmitting means transmitting signals to the server indicative of the user's geographical position and head orientation;

d) mapping means mapping the user's head orientation and geographical position to a physical layout for the performance of the task; and e) selecting and transmitting means selecting and transmitting to the terminal clips of audio sound instructing the user in the performance of the task based upon the user's mapped position and head orientation in the physical layout.

3. The system of claim 2 wherein the task to be performed may be taken from a group of tasks, not limited to, directing a user in steps (i) to a location in the physical layout; (ii) within a retail market; (iii) in locating other users.

4. The system of claim 2 wherein the server accesses a database to obtain clips of audio sound related to the performance of the task in the physical layout.

5. The system of claim 2 further comprising:
f) data describing Head Relative Transfer Functions stored in the mobile terminal.

6. The system of claim 2 further comprising:
g) a database coupled to the server for dynamically determining an audio emanation point based on a user's position.

7. The system of claim 6 wherein the database means stores the clips of audio sound, according to the steps in the task.

8. The system of claim 2 wherein the terminal plays a clip of audio sound which describes the step of the task to be performed by the user.

9. A method in a telemetric contextually based audio system integrated into a mobile terminal in a wireless system for instructing a user in the performance of a task, comprising:

a) coupling a user transported mobile terminal to a server via an air link;

b) coupling a headset to the terminal and including directional means indicating the user's head orientation relative to a task to be performed by the user;

c) transmitting signals to the server indicative of the user's geographical position and head orientation;

d) mapping the user's head orientation and geographical position to a physical layout for the performance of the task; and e) selecting and transmitting to the terminal clips of audio sound instructing the user in the performance of the task based upon the user's mapped position and head orientation in the physical layout.

10. The method of claim 9 wherein the task to be performed may be taken from a group of, tasks, not limited to, directing a user in steps (i) to a location in the physical layout; (ii) within a retail market, and (iii) locating other users.

11. The method of claim 9 wherein the server accesses a database to obtain clips of audio sound related to the performance of the task in the physical layout.

12. The method of claim 9 further comprising:
f) storing Head Relative Transfer Functions in the mobile terminal.

13. The method of claim 9 further comprising:
g) dynamically determining an audio emanation point based on a user's position using a database and the server.

14. The method of claim 13 wherein the database means stores the clips of audio sound, according to the steps in the task.

15. The method of claim 9 wherein the terminal plays a clip of audio sound which describes the step of the task to be performed by the user.

16. In a telemetric contextually based audio system, a wireless terminal for instructing a user in the performance of a task, comprising:

a) a transceiver including a compression/decompression amplifier for receiving audio signals;

b) a processor coupled to the transceiver and to an antenna via an I/O circuit;

c) a non-volatile memory coupled to the processor and storing program instructions for operating the terminal and processing generic audio clips into steps of a task; and d) a volatile memory coupled to the processor and storing data subsets descriptive of tasks performed by a user; user head orientation obtained from a directional device and geographical positional of the user obtained from a geographical position determining source, wherein the terminal updates its ephemeral data (current location and head orientation), and using the memory information recalculates which audio clip(s) to play.

17. The terminal of claim 16 wherein as the user's changes steps in the task, either a Previously Presented audio clip is played or the remainder of the existing audio clip is seamlessly spliced into the audio output.

18. In a telemetric contextually based audio system, a server for instructing a user in the performance of a task, comprising:

a) a processor coupled to a signal source for receiving positional data of a wireless terminal;

b) a storage device for storing a floor plan for guidance in the performance of a task by a user;

c) audio clips related to steps of the task performed by the user stored with respect to the floor plan;

d) receiving means receiving terminal transmissions providing users' head orientation and geographic position in the performance of the task;

e) mapping means mapping the head orientation and geographical position to the task in the floor plan; and f) selecting means selecting audio clips for transmission to the terminal for the performance of the task by the user.

19. The server of claim 18 wherein the server knowing the identity and location of the task(s) to be performed, the user's geographical position and head orientation, selects and transmits audio clips, relative to the task to be performed.

20. A telemetric contextually based audio system integrated into a mobile terminal in a wireless system for instructing a user in the performance of a task, comprising:

a) A user transported mobile terminal coupled to a server via an air link;

b) a headset coupled to the terminal and including directional means indicating the user's head orientation relative to a task to be performed by the user;

c) transmitting means transmitting signals to the server indicative of the user's geographical position and head orientation;

d) mapping means mapping the user's head orientation and geographical position to a physical layout for the performance of the task; and e) selecting and transmitting means selecting and transmitting to the terminal clips of audio sound instructing the user in the performance of the task based upon the user's mapped position and head orientation in the physical layout, wherein the task to be performed may be taken from a group of tasks, not limited to, directing a user in steps (i) to a location in the physical layout; (ii) within a retail market; (iii) in locating other users, and wherein the server accesses a database to obtain clips of audio sound related to the performance of the task in the physical layout, and wherein the terminal plays a clip of audio sound which describes the step of the task to be performed by the user.

21. A method in a telemetric contextually based audio system integrated into a mobile terminal in a wireless system for instructing a user in the performance of a task, comprising:
   a) coupling a user transported mobile terminal to a server via an air link;
   b) coupling a headset to the terminal and including directional means indicating the user's head orientation relative to a task to be performed by the user;
   c) transmitting signals to the server indicative of the user's geographical position and head orientation;
   d) mapping the user's head orientation and geographical position to a physical layout for the performance of the task; and
   e) selecting and transmitting to the terminal clips of audio sound instructing the user in the performance of the task based upon the user's mapped position and head orientation in the physical layout wherein the task to be performed may be taken from a group of tasks, not limited to, directing a user in steps (i) to a location in the physical layout; (ii) within a retail market, and (iii) locating other users, and wherein the server accesses a database to obtain clips of audio sound related to the performance of the task in the physical layout the terminal plays a clip of audio sound which describes the step of the task to be performed by the user.

22. A telemetric contextually based audio system integrated into a mobile terminal in a wireless system for instructing a user in the performance of a task, comprising:
   a) a user transported mobile terminal coupled to a server via an air link;
   b) a headset coupled to the terminal and including a directional indicator indicating the user's head orientation relative to a task to be performed by the user;
   c) a transmitter transmitting signals to the server indicative of the user's geographical position and head orientation; and
   d) The server configured to:
      (i) map the user's head orientation and geographical position to a physical layout for the performance of the task; and
      ii) select and transmit to the terminal clips of audio sound instructing the user in the performance of the task based upon the user's mapped position and head orientation in the physical layout.

23. In a telemetric contextually based audio system, a server for instructing a user in the performance of a task, comprising:
   a) a processor coupled to a signal source for receiving positional data of a wireless terminal;
   b) a storage device for storing a floor plan for guidance in the performance of a task by a user;
   c) audio clips related to steps of the task performed by the user stored with respect to the floor plan;
   d) a receiver receiving terminal transmissions providing users' head orientation and geographic position in the performance of the task; and
   e) the server configured to:
      (i) map the head orientation and geographical position to the task in the floor plan; and
      (ii) select audio clips for transmission to the terminal for the performance of the task by the user.

24. A telemetric contextually based audio system integrated into a mobile terminal in a wireless system for instructing a user in the performance of a task, comprising:
   a) A user transported mobile terminal coupled to a server via an air link;
   b) a headset coupled to the terminal and including a directional indicator indicating the user's head orientation relative to a task to be performed by the user;
   c) a transmitter transmitting signals to the server indicative of the user's geographical position and head orientation;
   d) mapping means mapping the user's head orientation and geographical position to a physical layout for the performance of the task; and
   e) the server configured to:
      (i) select and transmit to the terminal clips of audio sound instructing the user in the performance of the task based upon the user's mapped position and head orientation in the physical layout, wherein the task to be performed may be taken from a group of tasks, not limited to, directing a user in steps (i) to a location in the physical layout; (ii) within a retail market; (iii) in locating other users, and wherein the server accesses a database to obtain clips of audio sound related to the performance of the task in the physical layout, and wherein the terminal plays a clip of audio sound which describes the step of the task to be performed by the user.

25. A method in a telemetric contextually based audio system integrated into a mobile terminal in a wireless system for instructing a user in the performance of a task, comprising:
   a) coupling a user transported mobile terminal to a server via an air link;
   b) coupling a headset to the terminal and including a directional indicator indicating the user's head orientation relative to a task to be performed by the user;
   c) transmitting signals to the server indicative of the user's geographical position and head orientation;
   d) the server configured to:
      (i) map the user's head orientation and geographical position to a physical layout for the performance of the task; and
      (ii) select and transmit to the terminal clips of audio sound instructing the user in the performance of the task based upon the user's mapped position and head orientation in the physical layout wherein the task to be performed may be taken from a group of tasks, not limited to, directing a user in steps (iii) to a location in the physical layout; (iv) within a retail market, and (v) locating other users, and wherein the server accesses a database to obtain clips of audio sound related to the performance of the task in the physical layout the terminal plays a clip of audio sound which describes the step of the task to be performed by the user.

* * * * *